(12) United States Patent
Zhuo

(10) Patent No.: US 9,407,138 B2
(45) Date of Patent: Aug. 2, 2016

(54) CONTROL CIRCUIT AND CONTROL METHOD FOR CHARGE PUMP CIRCUIT

(71) Applicant: Silergy Semiconductor Technology (Hangzhou) LTD, Hangzhou, ZheJiang Province (CN)

(72) Inventor: Shenglong Zhuo, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 14/834,756

(22) Filed: Aug. 25, 2015

(65) Prior Publication Data

US 2016/0065060 A1 Mar. 3, 2016

(30) Foreign Application Priority Data

Aug. 26, 2014 (CN) .......................... 2014 1 0425499

(51) Int. Cl.
*G05F 3/02* (2006.01)
*G05F 1/10* (2006.01)
*H02M 3/07* (2006.01)

(52) U.S. Cl.
CPC ...................................... *H02M 3/07* (2013.01)

(58) Field of Classification Search
CPC . H02M 3/073; H02M 3/07; H02M 2003/077; G11C 5/145; G05F 3/205
USPC .......................................................... 327/536
See application file for complete search history.

(56) References Cited

U.S. PATENT DOCUMENTS

| | | | |
|---|---|---|---|
| 6,285,242 B1 * | 9/2001 | Hardee ......................... | 327/536 |
| 6,707,335 B2 | 3/2004 | Kawai et al. | |
| 7,671,664 B1 | 3/2010 | Moscaluk | |
| 8,295,064 B2 | 10/2012 | Shiwaya | |
| 8,854,119 B2 | 10/2014 | Jiang et al. | |
| 2006/0140018 A1 * | 6/2006 | Do ............................ | 365/189.09 |
| 2009/0140794 A1 * | 6/2009 | Wu ............................... | 327/536 |
| 2009/0206664 A1 * | 8/2009 | Sasaki et al. .................... | 307/33 |

FOREIGN PATENT DOCUMENTS

| | | | |
|---|---|---|---|
| CN | 101707438 A | | 5/2010 |
| JP | 2005073437 A | * | 3/2005 |

* cited by examiner

*Primary Examiner* — Quan Tra
(74) *Attorney, Agent, or Firm* — Michael C. Stephens, Jr.

(57) ABSTRACT

A method of controlling a charge pump circuit can include: (i) detecting a difference between an output voltage and an input voltage in real time; (ii) generating an error amplifying signal by comparing the difference between the output voltage and the input voltage against a predetermined difference; and (iii) generating a control voltage signal for controlling the charge pump circuit according to the error amplifying signal, where a frequency of the control voltage signal positively changes along with the difference between the output voltage and said input voltage when the difference between the output voltage and the input voltage is greater than the predetermined difference.

12 Claims, 7 Drawing Sheets

---

Detect a difference between an output voltage and an input voltage of a charge pump circuit in real time
201

↓

Generate an error amplifying signal by comparing the difference between the output voltage and the input voltage against a predetermined difference
202

↓

Generate a control voltage signal for controlling the charge pump circuit according to the error amplifying signal
203

US 9,407,138 B2

CONTROL CIRCUIT AND CONTROL METHOD FOR CHARGE PUMP CIRCUIT

RELATED APPLICATIONS

This application claims the benefit of Chinese Patent Application No. 201410425499.0, filed on Aug. 26, 2014, which is incorporated herein by reference in its entirety.

FIELD OF THE INVENTION

The present disclosure generally relates to the field of power electronics, and more particularly to control circuits and methods for a charge pump circuit.

BACKGROUND

A charge pump (also referred as a switch capacitor voltage converter), is a DC-DC converter that usually uses a flying capacitor (also referred as "pumping" capacitor) to store energy, and to generate a required DC output voltage. Charge pump circuits are becoming more and more popular as the power supply management can be optimized, and chips can be integrated without using any inductor or transformer in the charge pump circuitry. With the control of a voltage control signal, the charge pump circuit can pump the energy from an input terminal with an input voltage to an output terminal for an output voltage through a capacitor by turning on and off switches in the charge pump circuit, so as to generate a DC output voltage.

SUMMARY

In one embodiment, a method of controlling a charge pump circuit can include: (i) detecting a difference between an output voltage and an input voltage in real time; (ii) generating an error amplifying signal by comparing the difference between the output voltage and the input voltage against a predetermined difference; and (iii) generating a control voltage signal for controlling the charge pump circuit according to the error amplifying signal, where a frequency of the control voltage signal positively changes along with the difference between the output voltage and said input voltage when the difference between the output voltage and the input voltage is greater than the predetermined difference.

In one embodiment, a control circuit for a charge pump circuit can include: (i) an error detection and feedback circuit configured to detect an output voltage and an input voltage of a controlled charge pump circuit in real time, and to generate an error feedback signal that represents a difference between the output voltage and the input voltage; (ii) an error amplifying circuit configured to compare the error feedback signal against a predetermined reference voltage signal, and to generate an error amplifying signal, where the reference voltage signal represents a predetermined difference between the output voltage and the input voltage; and (iii) a control voltage signal generator configured to generate a control voltage signal for the controlled charge pump circuit according to the error amplifying signal, where a frequency of the control voltage signal positively changes along with the difference between the output voltage and the input voltage when the difference between the output voltage and the input voltage is greater than the predetermined difference.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
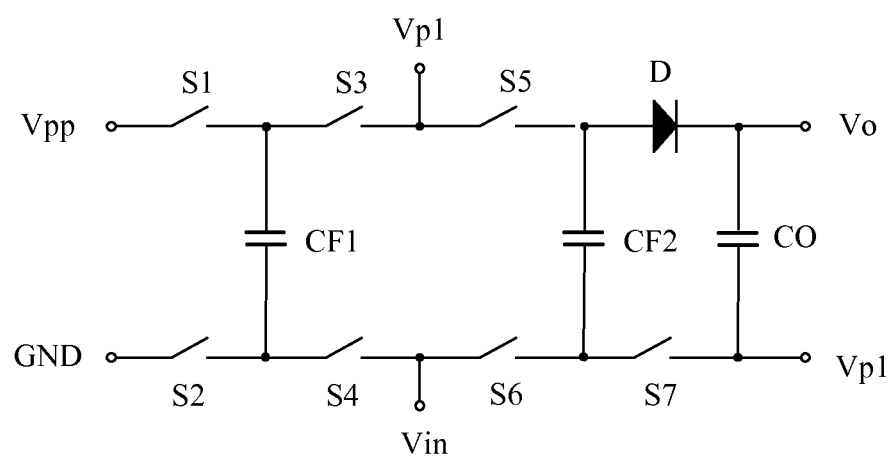
FIG. 1 is a schematic block diagram of an example charge pump circuit.

Referring now to FIG. 1, shown is a schematic block diagram of an example charge pump circuit. In this particular example, the charge pump circuit may be a charge pump step-up circuit including two stages, and the output voltage thereof may be $Vo=Vin+2Vpp-Vd$, where $Vd$ is the conduction voltage drop of diode D. However, an equivalent resistor of the charge pump circuit may be in inversely proportional to an equivalent step-up capacitor, as well as the operation frequency. In order to improve the response speed of the charge pump circuit, and to quickly regulate the charge pump circuit to enter a stable state, the equivalent resistor of the charge pump circuit should be relatively small. If the capacitor size is increased, this may increase the chip volume, and high power density may not be increased. If the operation frequency of the charge pump circuit is increased, this may reduce the efficiency by increasing power losses on the chip due to the frequency increase.

In one embodiment, a method of controlling a charge pump circuit can include: (i) detecting a difference between an output voltage and an input voltage in real time; (ii) generating an error amplifying signal by comparing the difference between the output voltage and the input voltage against a predetermined difference; and (iii) generating a control voltage signal for controlling the charge pump circuit according to the error amplifying signal, where a frequency of the control voltage signal positively changes along with the difference between the output voltage and said input voltage when the difference between the output voltage and the input voltage is greater than the predetermined difference.

Figure 2:
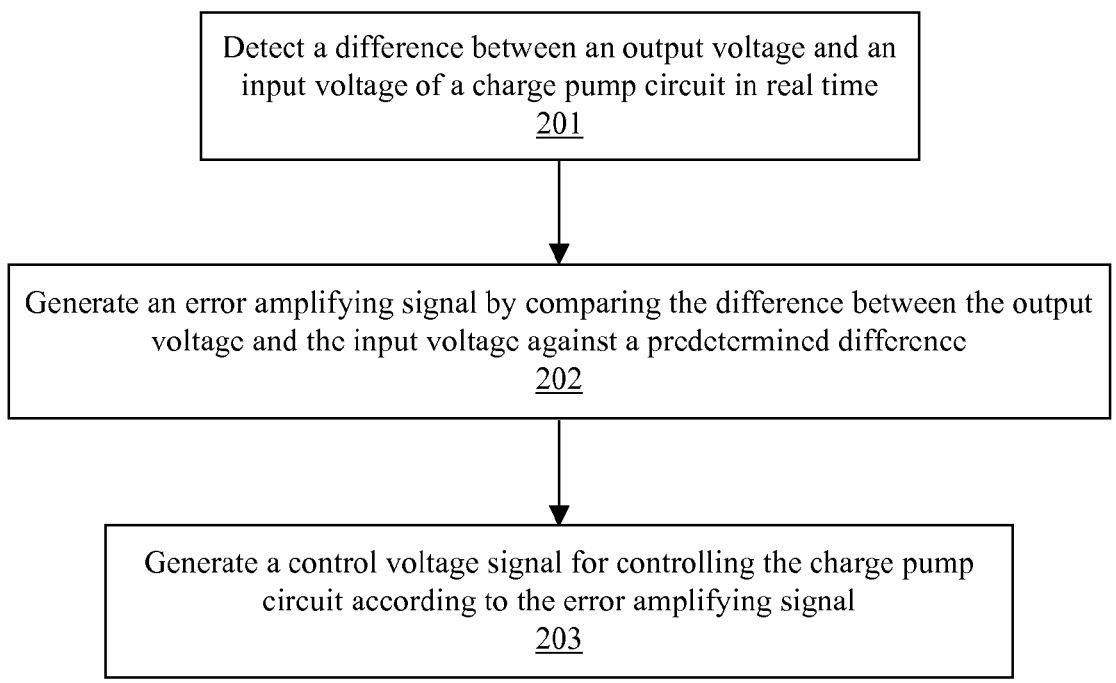
FIG. 2 is a flow diagram of an example method of controlling a charge pump circuit, in accordance with embodiments of the present invention.

Referring now to FIG. 2, shown is a flow diagram of an example method of controlling a charge pump circuit, in accordance with embodiments of the present invention. In this particular example, at 201, a difference between an output voltage and an input voltage of a charge pump circuit can be detected in real time. Input voltage Vin and output voltage Vo may be provided to a control circuit, and a difference between output voltage Vo and input voltage Vin may be detected in real time as ΔV=Vo−Vin. At 202, an error amplifying signal can be generated by comparing the difference between the output voltage and the input voltage against a predetermined difference.

For example, the predetermined difference may be set as ΔVth according to a difference between output voltage Vo and input voltage Vin. When the difference between output voltage Vo and input voltage Vin equals predetermined difference ΔVth, the circuit may in a "stable" state, and reference voltage signal Vref can be set to represent predetermined difference ΔVth. In this particular example, an error amplifying signal may be generated as Ve by comparing difference ΔV of output voltage Vo and input voltage Vin against reference voltage signal Vref through an error amplifying circuit. Error amplifying signal Ve can represent an error of difference ΔV between output voltage Vo and input voltage Vin against predetermined difference ΔVth.

At 203, a control voltage signal can be generated for controlling the charge pump circuit according to the error amplifying signal. The control voltage signal may be generated according to error amplifying signal Ve, where the frequency of the control voltage signal may be denoted by f(t). When ΔV>ΔVth, f(t) can positively change along with difference ΔV between output voltage Vo and input voltage Vin. That is, f(t) increases as ΔV increases, and f(t) decreases as ΔV decreases.

In one embodiment, a control circuit for a charge pump circuit can include: (i) an error detection and feedback circuit configured to detect an output voltage and an input voltage of a controlled charge pump circuit in real time, and to generate an error feedback signal that represents a difference between the output voltage and the input voltage; (ii) an error amplifying circuit configured to compare the error feedback signal against a predetermined reference voltage signal, and to generate an error amplifying signal, where the reference voltage signal represents a predetermined difference between the output voltage and the input voltage; and (iii) a control voltage signal generator configured to generate a control voltage signal for the controlled charge pump circuit according to the error amplifying signal, where a frequency of the control voltage signal positively changes along with the difference between the output voltage and the input voltage when the difference between the output voltage and the input voltage is greater than the predetermined difference.

Figure 3:
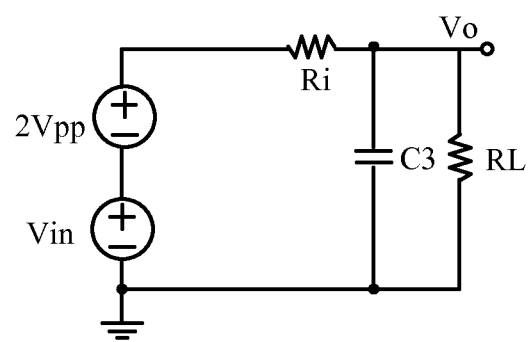
FIG. 3 is a schematic block diagram of an example equivalent circuit of a charge pump circuit, in accordance with embodiments of the present invention.

Referring now to FIG. 3, shown is a schematic block diagram of an example equivalent circuit of a charge pump circuit, in accordance with embodiments of the present invention. In this particular example, when the charge pump circuit is initiated (e.g., powered up and/or enabled), difference ΔV between output voltage Vo and input voltage Vin may be relatively large, and possibly even larger than predetermined difference ΔVth. In such a case, error amplifying signal Ve may also be relatively large, as well as the frequency of the control voltage signal. However, as equivalent resistance Ri of the charge pump circuit may be inversely proportional to the frequency of the control voltage signal, such that the output current of the charge pump circuit increases when equivalent resistor Ri thereof decreases, the charge pump circuit may quickly charge the load capacitor in order to rapidly pull-up output voltage Vo. As a result, the charge pump circuit may enter into the stable state relatively quickly due to the high response speed.

Before the charge pump circuit enters into the stable state, when output voltage Vo increases, difference ΔV between output voltage Vo and input voltage Vin may gradually decrease and be relatively close to predetermined difference ΔVth. During such a process, equivalent resistor Ri of the charge pump circuit can increase as the frequency of control voltage signal decreases. Thus, the stable operation current of the charge pump circuit may gradually decrease. When output voltage Vo is increased to a certain extent, difference ΔV between output voltage Vo and input voltage Vin equals predetermined difference ΔVth, and the charge pump circuit can maintain the control voltage signal at relatively low frequency to keep the relatively low stable operation current. When the charge pump circuit of particular embodiments is applied to a battery charge system, a relatively low static operation current and extended battery lifetime can be achieved.

Figure 4:
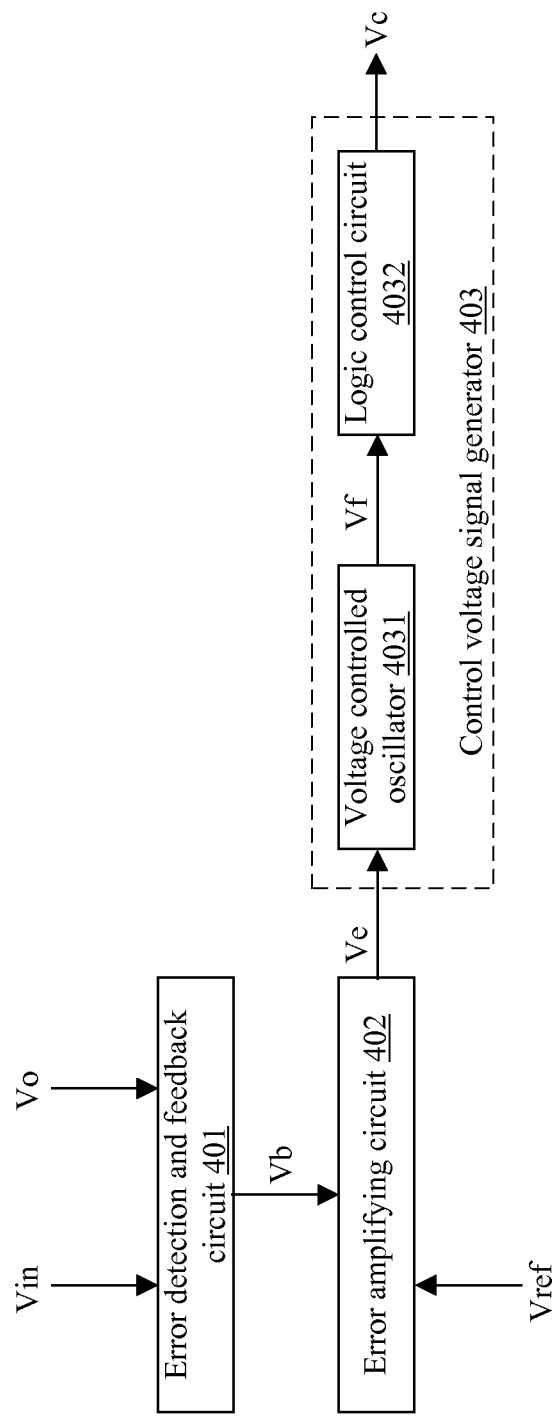
FIG. 4 is a schematic block diagram of an example control circuit for a charge pump circuit, in accordance with embodiments of the present invention.

Referring now to FIG. 4, shown is a schematic block diagram of an example control circuit for a charge pump circuit, in accordance with embodiments of the present invention. In this particular example, the control circuit can include error detection and feedback circuit 401, error amplifying circuit 402, and control voltage signal generator 403. Input voltage Vin and output voltage Vo (e.g., obtained by sampling) of the charge pump circuit (e.g., FIGS. 1, 3, 7) can be provided to error detection and feedback circuit 401. Error detection and feedback circuit 401 can generate error feedback signal Vb by detecting difference ΔV between output voltage Vo and input voltage Vin in real time, and error feedback signal Vb may be provided to error amplifying circuit 402.

Error amplifying circuit 402 can generate error amplifying signal Ve by comparing error feedback signal Vb against a predetermined reference voltage signal. For example, reference voltage signal Vref may be configured to represent predetermined difference ΔVth between output voltage Vo and input voltage Vin. Error amplifying signal Ve may be provided to control voltage signal generator 403. Control voltage signal generator 403 can generate a control voltage signal according to error amplifying signal Ve. When difference ΔV between output voltage Vo and input voltage Vin is greater than predetermined difference ΔVth, frequency f(t) of the control voltage signal can positively change along with difference ΔV between output voltage Vo and input voltage Vin. When ΔV>ΔVth, f(t) positively changes along with difference ΔV between output voltage Vo and input voltage Vin. That is f(t) increases when ΔV increases, and decreases when ΔV decreases.

Figure 5:
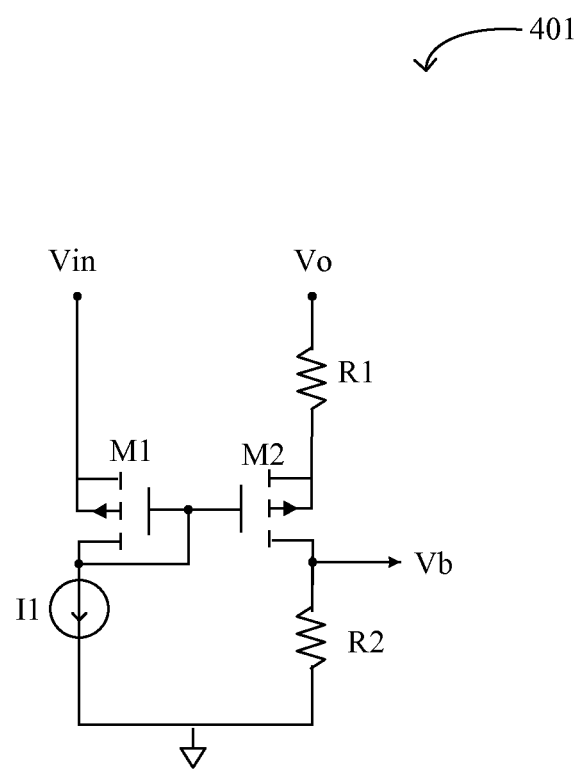
FIG. 5 is a schematic block diagram of an example error detection and feedback circuit, in accordance with embodiments of the present invention.

Referring now to FIG. 5, shown is a schematic block diagram of an example error detection and feedback circuit, in accordance with embodiments of the present invention. In this particular example, error detection and feedback circuit 401 can include power switches M1 and M2, and resistors R1 and R2. For example, power switches M1 and M2 can each be implemented as PMOS transistors. In this case, the source of power switch M1 can connect to the input terminal of input voltage Vin, and the gate of power switch M1 can connect to the gate of power switch M2. For example, power switch M1 may be turned on when input voltage Vin is provided to the controlled charge pump circuit.

In addition, the gate and drain of power switch M1 can be connected to each other, and current source I1 can connect in series to a common node of the gate and drain of power switch M1, and also to the control ground. Therefore, power switch M1 may remain on as being biased by current source I1 when input voltage Vin is applied. The source of power switch M2 can connect to the output terminal of output voltage Vo via resistor R1, and the drain of power switch M2 can connect to the control ground via resistor R2. A common node of the drain of power switch M2 and resistor R2 may be configured as the output terminal of error detection and feedback circuit 401 to output error feedback signal Vb. Also, power switch M2 can remain on when output voltage Vo is generated.

When input voltage Vin and output voltage Vo are provided, power switches M1 and M2 can both be on. In such a case, the gate voltages of power switches M1 and M2 can both be Vg=VIN−Vth, where Vth is a threshold voltage of power switch M1. The voltage of resistor R1 may be Vo−Vg−Vth=Vo−Vin, and the current flowing through resistor R1 may be (Vo−Vin)/R1. Thus, the voltage at a first terminal of resistor R2 can equal error feedback signal Vb=(Vo−Vin)*R2/R1 as power switch M2 may be on. Here, error feedback signal Vb can represent difference ΔV between output voltage Vo and input voltage Vin. In this example, error feedback signal Vb may be in direct proportion to difference ΔV between output voltage Vo and input voltage Vin.

Figure 6:
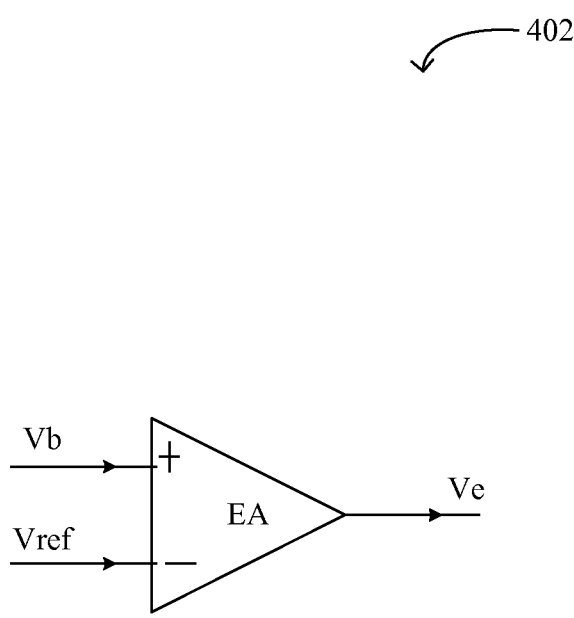
FIG. 6 is a schematic block diagram of an example error amplifying circuit, in accordance with embodiments of the present invention.

Referring now to FIG. 6, shown is a schematic block diagram of an example error amplifying circuit, in accordance with embodiments of the present invention. In this particular example, error amplifying circuit 402 can be implemented by comparator EA. For example, comparator EA may have a non-inverting input terminal connected to the output terminal of error detection and feedback circuit 401 for receiving error feedback signal Vb. An inverting input terminal of comparator EA may receive reference voltage signal Vref that represents predetermined difference ΔVth. Also, an output terminal of comparator EA may generate error amplifying signal Ve. For example, when difference ΔV between output voltage Vo and input voltage Vin increases, error amplifying signal Ve may also accordingly increase.

Referring back to FIG. 4, control voltage generator 403 can include voltage controlled oscillator 4031 and logic control circuit 4032. In this arrangement, an input terminal of voltage controlled oscillator 4031 can connect to the output terminal of error amplifying circuit 402, and an output terminal of voltage controlled oscillator 4031 can connect to an input terminal of logic control circuit 4032. Voltage controlled oscillator 4031 can generate frequency control signal Vf according to error amplifying signal Ve. When difference ΔV between output voltage Vo and input voltage Vin is greater than predetermined difference ΔVth, the frequency of frequency control signal Vf can positively change along with difference ΔV between output voltage Vo and input voltage Vin. For example, frequency control signal Vf can be a square signal with a 50% duty cycle. When error amplifying signal Ve increases, the frequency of the square signal generated by voltage controlled oscillator 4031 can also increase, and vice versa.

Logic control circuit 4032 can generate control voltage signal Vc according to frequency control signal Vf. In this way, the frequency of control voltage signal Vc may follow the frequency of frequency control signal Vf. For example, the frequency of control voltage signal Vc may equal the frequency of frequency control signal Vf. When the charge pump circuit is initiated, difference ΔV between output voltage Vo and input voltage Vin can be relatively large, and possibly even larger than predetermined difference ΔVth. In such a case, error amplifying signal Ve may also be large, as well as the frequencies of frequency control signal Vf and control voltage signal Vc. However, as equivalent resistor Ri of the charge pump circuit may be relatively low, the current of the charge pump circuit may be relatively large, and the charge pump circuit may quickly charge the load capacitor and rapidly pull-up output voltage Vo. As a result, the charge pump circuit may enter into the stable state relatively quickly due to the high response speed.

Before the charge pump circuit enters into the stable state, when output voltage Vo is increasing, difference ΔV between output voltage Vo and input voltage Vin may gradually decrease and be relatively close to predetermined difference ΔVth. During such a process, error amplifying signal Ve may gradually decrease, as well as the frequency of frequency control signal Vf. Equivalent resistor Ri of the charge pump circuit may increase as the frequency of control voltage signal Vc is decreasing, such that the stable operation current of the charge pump circuit may gradually decrease. When output voltage Vo is increased to a certain extent, difference ΔV between output voltage Vo and input voltage Vin can equal predetermined difference ΔVth, the charge pump circuit can maintain control voltage signal Vc at a relatively low level, and may keep the relatively stable operation current. When the charge pump circuit of particular embodiments is applied to a battery charge system, a relatively low static operation current and extended battery life time can be achieved.

Figure 7:
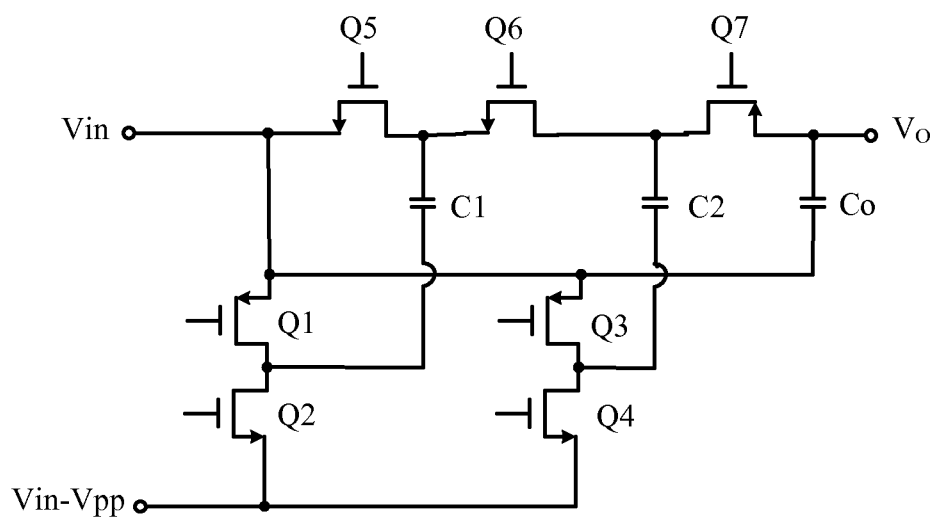
FIG. 7 is a schematic block diagram of an example charge pump step-up circuit, in accordance with embodiments of the present invention.

Referring now to FIG. 7, shown is a schematic block diagram of an example charge pump step-up circuit, in accordance with embodiments of the present invention. In this particular example, the charge pump circuit can include: capacitors C1, C2, and Co, as well as switches (e.g., transistors) Q1, Q2, Q3, Q4, Q5, Q6 and Q7. A first terminal of switch Q1 can connect to the input terminal of input voltage Vin, and a second terminal of switch Q1 can connect to a first terminal of switch Q2. A second terminal of switch Q2 can connect to a reference ground of the charge pump circuit. For example the voltage of the reference ground can be substantially constant (e.g., Vin−Vpp).

A first terminal of switch Q3 can connect to the input terminal of input voltage Vin, and a second terminal of switch Q3 can connect to a first terminal of switch Q4. A second terminal of switch Q4 can connect to the reference ground. A first terminal of switch Q5 can connect to the input terminal of input voltage Vin, and a second terminal of switch Q5 can connect to a first terminal of switch Q6. A second terminal of switch Q6 can connect to a first terminal of switch Q7. A second terminal of switch Q7 can connect to the output terminal of output voltage Vo. Capacitor C1 can connect between the second terminal of switch Q5 and the second terminal of switch Q3. Capacitor C2 can connect between the second terminal of switch Q6 and the second terminal of switch Q3. Also, output capacitor Co can connect between the output terminal of output capacitor Vo and the input terminal of input voltage Vin.

After control voltage signal Vc is obtained, an inverter may be used to generate a control voltage signal with the same frequency, but opposite phase with control voltage signal Vc by inverting control voltage signal Vc. For example, control voltage signal Vc may be referred as the first control voltage signal, and may be input to the control terminals of switches Q2, Q5, Q3, and Q7. The opposite/inverted control voltage signal may be referred as the second control voltage signal, and may be input to the control terminals of switches Q1, Q4, and Q6. Thus, when switches Q2, Q5, Q3, and Q7 are on, switches Q1, Q4, and Q6 are off. Similarly, when switches Q1, Q4, and Q6 are on, switches Q2, Q5, Q3, and Q7 are off.

With the control of the first and second voltage control signals, switches Q1, Q4, and Q6 may be off when switches Q2, Q5, Q3, and Q7 are on. In this case, at the input terminal of input voltage Vin, the voltage at the first terminal of capacitor C1 can be Vin, and the voltage at the second terminal may be the voltage at the reference ground (e.g., Vin−Vpp). Input voltage Vin can charge capacitor C1 by turning on switches Q5 and Q2, and the charge loop may be: Vin-Q5-C1-Q2-reference ground. Until the voltage across capacitor C1 decreases to Vpp, the energy may initially be stored in capacitor C1, and then may be discharged to capacitor C2 in the next half switching cycle.

At the output terminal of output voltage Vo, by turning off switches Q1 and Q6, capacitor C2 may effectively be disconnected from the input terminal of input voltage Vin and capacitor C1. The energy stored in capacitor C2 can be provided to the output terminal of output voltage Vo through output capacitor Co by turning on switches Q7 and Q3. When switches Q2, Q5, Q3, and Q7 are off, switches Q1, Q4, and Q6 are on. When the charge loop from input voltage Vin to capacitor C1 is effectively disconnected, and the power supply loop from capacitor C2 to the output terminal of output voltage Vo is effectively disconnected, capacitor C1 can charge capacitor C2, and the charge loop may be: C1-Q6-C2-Q4-Q1.

Because capacitor voltage may not suddenly change, the second terminal of capacitor C1 may be electrically coupled to input voltage Vin. The voltage at the first terminal of capacitor C1 may be pumped to Vin+Vpp with respect to the ground, and the voltage at the first terminal of capacitor C2 may be Vin+Vpp as switch Q6 may be on. The voltage at the second terminal of capacitor C2 may be the voltage Vin−Vpp of the reference ground, as switch Q4 may be on. Also, capacitor C1 can charge capacitor C2 until the voltage across capacitor C2 decreases to 2Vpp, so as to store energy in capacitor C2, and to provide output voltage Vo in the next half switching cycle.

FIG. 7 is a schematic diagram that may be an equivalent circuit of the charge pump step-up circuit of FIG. 3. For example, PMOS transistors can be employed to implement switches Q1, Q3, and Q7, and NMOS transistors can be employed to implement switches Q2, Q4, Q5, and Q6. The switching states of NMOS transistors and PMOS transistors can be opposite to each other with appropriate opposite control signals. For example, the source of switch Q1 can connect to the input terminal of the input voltage, the drain of switch Q1 can connect to the drain of switch Q2, and the source of switch Q2 can connect to the reference ground. The source of switch Q3 can connect to the input terminal of the input voltage Vin, the drain of switch Q3 can connect to the drain of switch Q4, and the source of switch Q4 can connect to the reference ground. The source of switch Q5 can connect to the input terminal of the input voltage Vin, and the drain of switch Q5 can connect to the source of switch Q6. The drain of switch Q6 can connect to the drain of switch Q7, and the source of switch Q7 can connect to the output terminal of output voltage Vo.

In the charge pump circuit of this particular example, switch Q7 may be used to replace diode D in FIG. 1. Therefore, adverse effects on the efficiency of the charge pump circuit caused by a voltage drop on the diode can be reduced, and a high output voltage can still be obtained at the output terminal of output voltage Vo even when threshold voltage Vpp is relatively small. In addition, while a two-stage charge pump circuit is shown in the example of FIG. 7, any suitable number of stages (e.g., three-stage, four-stage, etc.) can be used in such a charge pump arrangement in particular embodiments.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of controlling a charge pump circuit, the method comprising:
    a) detecting a difference between an output voltage and an input voltage in real time;
    b) generating an error amplifying signal by comparing said difference between said output voltage and said input voltage against a predetermined difference; and
    c) generating a control voltage signal for controlling said charge pump circuit according to said error amplifying signal, wherein a frequency of said control voltage signal positively changes along with said difference between said output voltage and said input voltage when said difference between said output voltage and said input voltage is greater than said predetermined difference.

2. The method of claim 1, wherein said charge pump circuit comprises:
    a) a first switch having a first terminal coupled to an input terminal that receives said input voltage, and a second terminal coupled to a first terminal of a second switch, wherein a second terminal of said second switch is coupled to a ground of said charge pump circuit;
    b) a third switch having a first terminal coupled to said input terminal, and a second terminal coupled to a first terminal of a fourth switch, wherein a second terminal of said fourth switch is coupled said ground;
    c) a fifth switch having a first terminal coupled to said input terminal, a second terminal coupled to a first terminal of a sixth switch, wherein a second terminal of said sixth switch is coupled to a first terminal of said seventh switch, and a second terminal of said seventh switch is coupled to an output terminal that provides said output voltage;
    d) a first step-up capacitor coupled between said second terminal of said fifth switch and said second terminal of said first switch;
    e) a second step-up capacitor coupled between said second terminal of said sixth switch and said second terminal of said third switch; and
    f) an output capacitor coupled between said output terminal and said input terminal.

3. The method of claim 1, wherein said generating said control voltage signal for controlling said charge pump circuit according to said error amplifying signal comprises:
    a) generating a first control voltage signal and a second control voltage signal that are opposite to each other according to said error amplifying signal, wherein a frequency of said first and second control voltage signals positively changes along with said difference between said output voltage and said input voltage;
    b) providing said first control voltage signal to control terminals of said second switch, fifth, third, and said seventh switches, and providing said second control voltage signal to control terminals of said first, fourth, and said sixth switches;
    c) when said second, fifth, third, and seventh switch are on, said first, fourth, and sixth switches are off, for charging said first step-up capacitor, and providing a voltage to said output terminal by said second step-up capacitor through said output capacitor; and d) when said first, fourth, and sixth switches are on, said second, fifth, third, and seventh switches are on, for charging said second step-up capacitor by said first step-up capacitor.

4. A control circuit for a charge pump circuit, the control circuit comprising:
   a) an error detection and feedback circuit configured to detect an output voltage and an input voltage of a controlled charge pump circuit in real time, and to generate an error feedback signal that represents a difference between said output voltage and said input voltage;
   b) an error amplifying circuit configured to compare said error feedback signal against a predetermined reference voltage signal, and to generate an error amplifying signal, wherein said reference voltage signal represents a predetermined difference between said output voltage and said input voltage; and
   c) a control voltage signal generator configured to generate a control voltage signal for said controlled charge pump circuit according to said error amplifying signal, wherein a frequency of said control voltage signal positively changes along with said difference between said output voltage and said input voltage when said difference between said output voltage and said input voltage is greater than said predetermined difference.

5. The control circuit of claim 4, wherein said error detection and feedback circuit comprises:
   a) a first power switch having a first terminal coupled to an input terminal of said input voltage;
   b) a second power switch having a control terminal coupled to a control terminal of said first power switch, a first terminal coupled to an output terminal of said output voltage through a first resistor, and a second terminal coupled to a control ground through a second resistor, wherein a common node of said second power switch and said second resistor is configured as an output terminal of said error detection and feedback circuit; and
   c) said first and second power switches being on when said input voltage and said output voltage are active.

6. The control circuit of claim 5, wherein:
   a) each of said first and second power switches comprises a PMOS transistor;
   b) a source of said first power switch is coupled said input terminal of said input voltage, a gate of said first power switch is coupled to a gate of said second power switch, and a drain of said first power switch is coupled to said gate and to said control ground through a current source, wherein said first power switch remains on as being biased by said current source when said input voltage is active; and
   c) a source of said second power switch is coupled to said output terminal of said output voltage through said first resistor, a gate of said second power switch is coupled to said control ground through said second resistor, and a common node of said second power switch and said second resistor is configured as said output terminal of said error detection and feedback circuit.

7. The control circuit of claim 4, wherein said control voltage signal generator comprises:
   a) a voltage controlled oscillator coupled to said output terminal of said error amplifying circuit, and being configured to generate a frequency control signal according to said error amplifying signal, wherein a frequency of said frequency control signal positively changes along with said difference between said output voltage and said input voltage when said difference between said output voltage and said input voltage is greater than said predetermined difference; and
   b) a logic control circuit coupled to an output terminal of said voltage controlled oscillator, and being configured to generate said control voltage signal according to said frequency control signal, wherein a frequency of said control voltage signal follows that of said frequency control signal.

8. The control circuit of claim 7, wherein said frequency of said control voltage signal is equal to said frequency of said frequency control signal.

9. A charge pump circuit comprising:
   a) said control circuit of claim 4; and
   b) a charge pump step-up circuit coupled to an output terminal said control voltage signal generator, and being configured to generate an expected output voltage by converting said input voltage with said control voltage signal.

10. The charge pump circuit of claim 9, wherein said charge pump step-up circuit comprises:
    a) a first switch having a first terminal coupled to an input terminal that receives said input voltage, and a second terminal coupled to a first terminal of a second switch, wherein a second terminal of said second switch is coupled to a ground of said charge pump circuit;
    b) a third switch having a first terminal coupled to said input terminal, and a second terminal coupled to a first terminal of a fourth switch, wherein a second terminal of said fourth switch is coupled said ground;
    c) a fifth switch having a first terminal coupled to said input terminal, a second terminal coupled to a first terminal of a sixth switch, wherein a second terminal of said sixth switch is coupled to a first terminal of said seventh switch, and a second terminal of said seventh switch is coupled to an output terminal that provides said output voltage;
    d) a first step-up capacitor coupled between said second terminal of said fifth switch and said second terminal of said first switch;
    e) a second step-up capacitor coupled between said second terminal of said sixth switch and said second terminal of said third switch; and
    f) an output capacitor coupled between said output terminal and said input terminal.

11. The charge pump circuit of claim 10, wherein:
    a) said control voltage signal comprises a first control voltage signal and a second control voltage signal that are opposite to each other;
    b) said first control voltage signal is provided to control terminals of said second, fifth, third, and seventh switches;
    c) said second control voltage signal is provided to control terminals of said first, fourth, and sixth switches;
    d) when said second, fifth, third, and seventh switches are on, said first, fourth, and sixth switches are off; and
    e) when said first, fourth, and sixth switches are on, said second, fifth, third, and seventh switches are off.

12. The charge pump circuit of claim 11, wherein:
    a) each of said first, third, and seventh switches comprises a PMOS transistor;
    b) each of said second, fourth, fifth, and sixth switches comprises an NMOS transistor;
    c) a source of said first switch is coupled to said input terminal of said input voltage, a drain of said first switch is coupled to a drain of said second switch, and a source of said second switch is coupled to a reference ground; and d) a source of said third switch is coupled to said input terminal of said input voltage, a drain of said third switch is coupled to a drain of said fourth switch, a source of said fourth switch is coupled to said reference ground, a source of said fifth switch is coupled to an input terminal of said input voltage, a drain of said fifth switch is coupled to a source of said sixth switch, a drain of said sixth switch is coupled to a drain of said seventh switch, and a source of said seventh switch is coupled to an output terminal of said output voltage.

* * * * *